US012092288B2

(12) United States Patent
Chen

(10) Patent No.: US 12,092,288 B2
(45) Date of Patent: Sep. 17, 2024

(54) FLOOR LAMP DEVICE WITH IMPROVED STRUCTURE

(71) Applicant: Dongguan LianRun Lighting Co., Ltd., Dongguan (CN)

(72) Inventor: Kunpeng Chen, Dongguan (CN)

(73) Assignee: Donnguan LianRun Lighting Co., Ltd., Dongguan (CN)

( * ) Notice: Subject to any disclaimer, the term of this patent is extended or adjusted under 35 U.S.C. 154(b) by 6 days.

(21) Appl. No.: 18/458,439

(22) Filed: Aug. 30, 2023

(65) Prior Publication Data

US 2023/0408050 A1 Dec. 21, 2023

(30) Foreign Application Priority Data

Aug. 22, 2023 (CN) ........................ 202322253113.X

(51) Int. Cl.
*F21S 6/00* (2006.01)
*F21V 21/08* (2006.01)

(52) U.S. Cl.
CPC .......... *F21S 6/004* (2013.01); *F21V 21/0824* (2013.01)

(58) Field of Classification Search
CPC ......... F21V 21/0824; F21W 2131/109; F21W 2131/10; F21S 8/081; F21S 6/00
See application file for complete search history.

(56) References Cited

U.S. PATENT DOCUMENTS

| | | | | |
|---|---|---|---|---|
| 6,799,869 | B1 * | 10/2004 | Beadle | F21V 31/00 362/267 |
| 8,827,512 | B1 * | 9/2014 | Beadle | F21V 17/168 362/310 |
| 2010/0128471 | A1 | 5/2010 | Swanson | |
| 2010/0128477 | A1 | 5/2010 | Swanson | |
| 2017/0167671 | A1 | 6/2017 | Smith et al. | |

* cited by examiner

*Primary Examiner* — William J Carter
(74) *Attorney, Agent, or Firm* — Zhigang Ma

(57) ABSTRACT

The present disclosure relates to the technical field of floor lamp devices, and discloses a floor lamp device with an improved structure. The floor lamp device includes a lamp and a grounding device; the grounding device includes an insertion rod and an inner mounting seat which are in snap fit with each other; a sharp end portion convenient for grounding is arranged at a tail end of the insertion rod; an assembling portion is arranged at a top end of the insertion rod; the assembling portion is provided with a fastener; an accommodating position used for mounting the lamp is arranged at a top end of the inner mounting seat; a fastening position matched with the fastener is arranged at a bottom end of the inner mounting seat; the floor lamp device further includes an outer decorative lampshade; and the outer decorative lampshade sleeves the inner mounting seat.

9 Claims, 6 Drawing Sheets

FLOOR LAMP DEVICE WITH IMPROVED STRUCTURE

TECHNICAL FIELD

The present disclosure relates to the technical field of lamps, and in particular, to a floor lamp device with an improved structure.

BACKGROUND

With the popularity of electricity, lamps have been used in thousands of households. People are no longer limited to using lamps for ordinary lighting, but also more inclined to use lamps to create different atmospheres. For example, people use lamps to decorate family parks, gardens, and other outdoor places to heighten the atmosphere, spice up the parties, enhance the artistic effect, etc. A floor lamp is a lamp that is often used to decorate the floor.

Chinese patent CN202022715054.X discloses an underground lamp. The underground lamp includes an end cover, a light control module, a transparent lampshade, a light reflection structure, and a bayonet socket. The floor lamp is fixed on the ground through the bayonet socket. The light control module is mounted in the end cover and is configured to control a light emitting source to emit light. The emitted light is transmitted through the end cover and the transparent lampshade. In the prior art, a floor insertion rod is fixedly connected to a connecting pipe after a top of the floor insertion rod is tightly assembled to the connecting pipe. However, this fixing manner is poor in stability. If a floor lamp is used for longer time, it is easy for an insertion rod to loosen and fall off. In order to solve the above problem, the inventor has made a new invention.

SUMMARY

The present disclosure aims to overcome the shortcomings in the prior art and provide a floor lamp device with an improved structure, which has the characteristic of firmly assembling an insertion rod.

In order to achieve the above objective, the present disclosure provides a floor lamp device with an improved structure, including a lamp and a grounding device; the grounding device includes an insertion rod and an inner mounting seat which are in snap fit with each other; a sharp end portion convenient for grounding is arranged at a tail end of the insertion rod; an assembling portion is arranged at a top end of the insertion rod; the assembling portion is provided with a fastener; an accommodating position used for mounting the lamp is arranged at a top end of the inner mounting seat; a fastening position matched with the fastener is arranged at a bottom end of the inner mounting seat; the floor lamp device further includes an outer decorative lampshade; and the outer decorative lampshade sleeves the inner mounting seat.

Preferably, the assembling portion is hollowed; the assembling portion includes a first elastic portion and a second elastic portion which are oppositely arranged; an elastic clearance is arranged between the first elastic portion and the second elastic portion; a cavity for inserting the elastic portions is arranged at a bottom of the inner mounting seat; and the fastener is arranged below an outer side of an elastic member.

Preferably, an assembling groove used for limiting and fixing the elastic portions is further arranged in the cavity.

Further, the lamp includes a lamp holder and a bulb electrically connected to the lamp holder; the lamp holder is connected with a power cable; and a first cable accommodating channel for allowing the power cable to be threaded out is formed on a side wall of the accommodating position.

Preferably, a group of second cable accommodating channels for accommodating the power cable is formed at joints of the insertion rod and the inner mounting seat.

Further, a clamping portion for clamping the lamp is arranged at a top end of the accommodating position.

Preferably, a first platform portion is arranged at a bottom of the inner mounting seat; at least one group of bosses are arranged above the first platform portion; a second platform portion is arranged at a bottom end of the outer decorative lampshade; the second platform portion is symmetrically provided with at least one group of gaps; and when the bosses are put into the outer decorative lampshade from the gaps and the inner mounting seat is rotated along the outer decorative lampshade, the second platform portion is stuck between the first platform portion and the bosses.

Preferably, the outer decorative lampshade is in a split type; and the outer decorative lampshade includes an outer decorative lamp cap and an outer decorative bulb shell.

Further, an external thread portion is arranged on an outer side of a bottom end of the outer decorative bulb shell; and the outer decorative lamp cap is provided with an internal thread portion matched with the external thread portion.

Preferably, a wire rod positioning portion is arranged outside the inner mounting seat.

Beneficial effects: Compared with the prior art, the floor lamp device with the improved structure has the following advantages: 1: The insertion rod and the inner mounting seat are in snap fit, so that the insertion rod is assembled firmly and hard to fall off. 2: The service life of the floor lamp device is effectively prolonged. 3: The floor lamp device has a simple overall structure and low preparation cost. 4: The assembling portion arranged at the top of the insertion rod is further inserted to the inner mounting seat, which improves the connection strength.

REFERENCE NUMERALS INCLUDE

Figure 1:
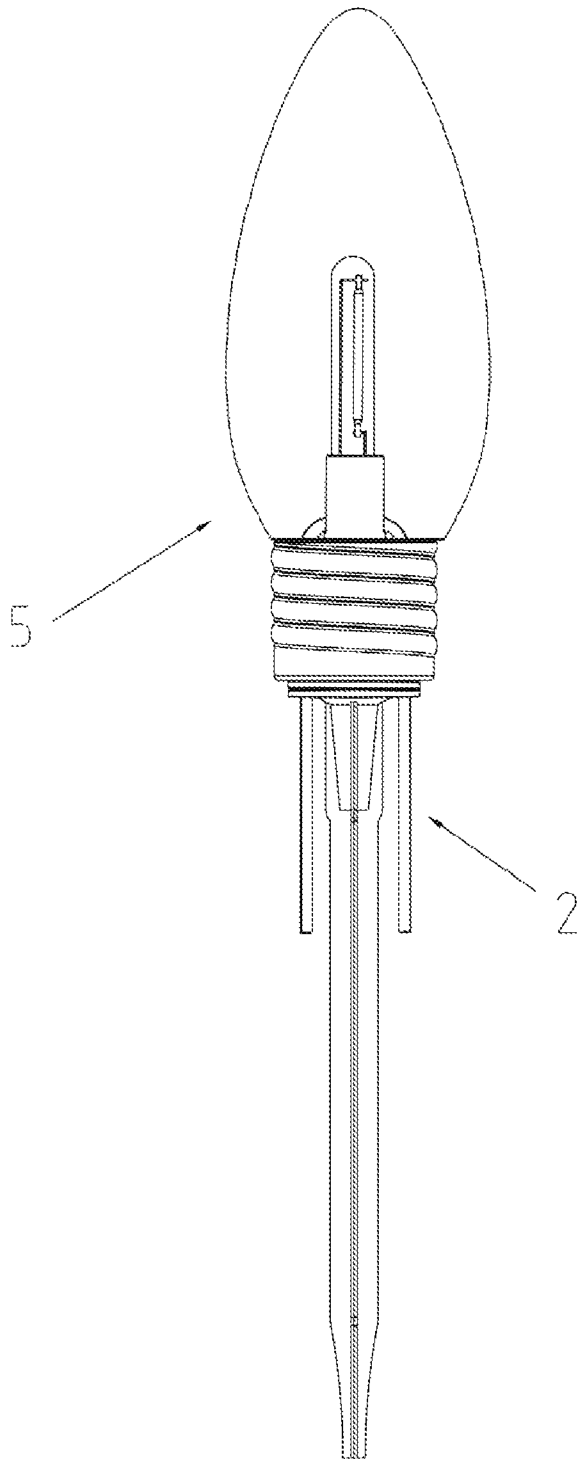
FIG. 1 is a schematic diagram of an overall structure of the present disclosure.
Figure 2:
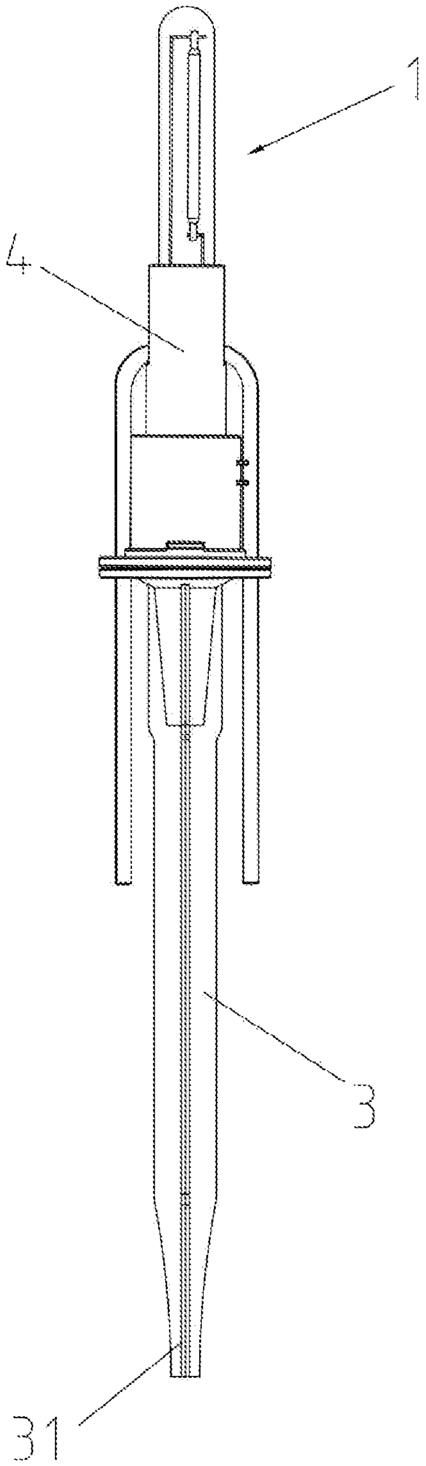
FIG. 2 is a schematic structural diagram of a grounding device of the present disclosure.
Figure 3:
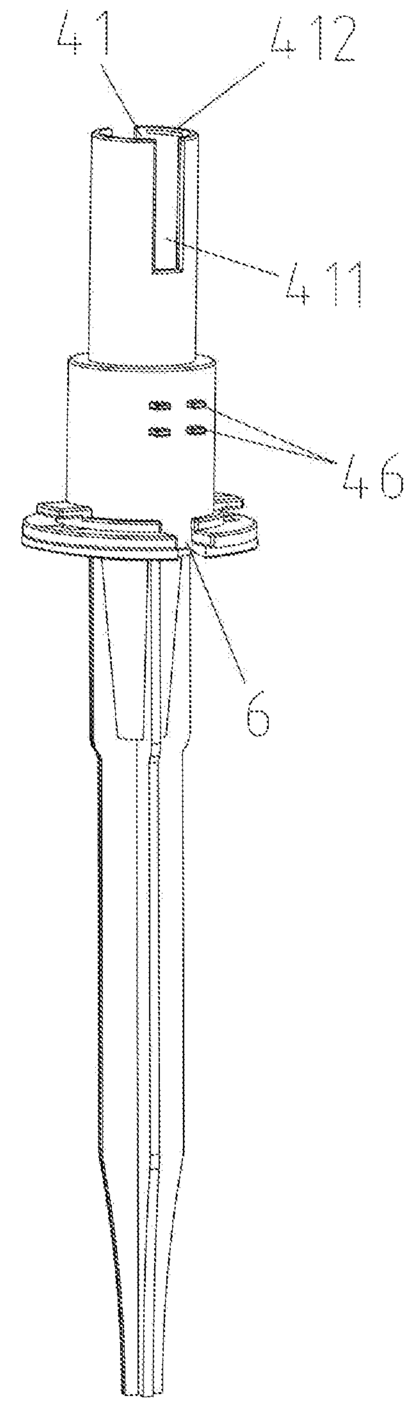
FIG. 3 is a schematic structural diagram of a grounding device of the present disclosure in another view.

1: lamp; 11: lamp holder; 12: bulb; 13: power cable; 2: grounding device; 3: insertion rod; 31: sharp end portion; 32: assembling portion; 321: first elastic portion; 322: second elastic portion; 323: elastic clearance; 33: fastener; 4: inner mounting seat; 41: accommodating position; 411: first cable accommodating channel; 412: clamping portion; 42: fastening position; 43: cavity; 431: assembling groove; 44: first platform portion; 45: boss; 46: wire rod positioning portion; 5: outer decorative lampshade; 51: second platform portion; 511: gap; 52: outer decorative lamp cap; 521:

internal thread portion; 53: outer decorative bulb shell; 531: external thread portion; and 6: second cable accommodating channel.

DETAILED DESCRIPTION OF THE EMBODIMENTS

The present disclosure is described in detail below in combination of FIG. 1-FIG. 6.

The present disclosure provides a floor lamp device with an improved structure, including a lamp 1 and a grounding device 2. The grounding device 2 includes an insertion rod 3 and an inner mounting seat 4 which are in snap fit with each other. The insertion rod 3 includes a sharp end portion 31, a assembling portion 32, fasteners 33, and a supporting portion 34. The sharp end portion 31 is convenient for grounding and is arranged at a tail end of the insertion rod 3. The assembling portion 32 is arranged at a top end of the insertion rod 3. The supporting portion 34 is arranged between the sharp end portion 31 and the assembling portion 32. The inner mounting seat 4 is hollow, and includes an accommodating portion 401, a fastening portion 402, and a first platform portion 44. The accommodating portion 401 extends from an outer surface of a top of the fastening portion 402, and defines an accommodating position 41 for mounting the lamp 1. The first platform portion 44 defines, at its bottom surface, fastening positions 42 matched with the fasteners 33. The floor lamp device further includes an outer decorative lampshade 5. The outer decorative lampshade 5 is sleeved on the inner mounting seat 4. The present disclosure improves a connection manner between the insertion rod 3 and the inner mounting seat 4, so that the insertion rod 3 is in snap fit with the inner mounting seat 4. The assembling is facilitated, while the insertion rod and the inner mounting seat are assembled firmly and do not fall off easily, so that the service life of the floor lamp device is effectively prolonged.

Preferably, the assembling portion 32 is hollowed, so that raw materials are saved. The assembling portion 32 includes a first elastic portion 321 and a second elastic portion 322 which are arranged opposite each other on the supporting portion 34. An elastic clearance 323 is formed between the first elastic portion 321 and the second elastic portion 322. The fastening portion 402 extends from the first platform portion 44, and defines a cavity 43 for inserting the elastic first elastic portion 321 and the second elastic portion 322. The fasteners 33 are arranged on the supporting portion 34 and located outside of a bottom of the assembling portion 32. During assembling of the lamp 1, the fastener 33 is fastened at the fastening position 42, and the first elastic portion 321 and the second elastic portion 322 above the fastener 33 are simultaneously inserted into the cavity 43 of the inner mounting seat 4, which improves the connection strength of the inner mounting seat 4 and the insertion rod 3. The elastic clearance 323 is arranged between the first elastic portion 321 and the second elastic portion 322, so that the first elastic portion 321 and the second elastic portion 322 can retract inwards under a force, and it is convenient to put the elastic portions into the cavity 43.

Figure 4:
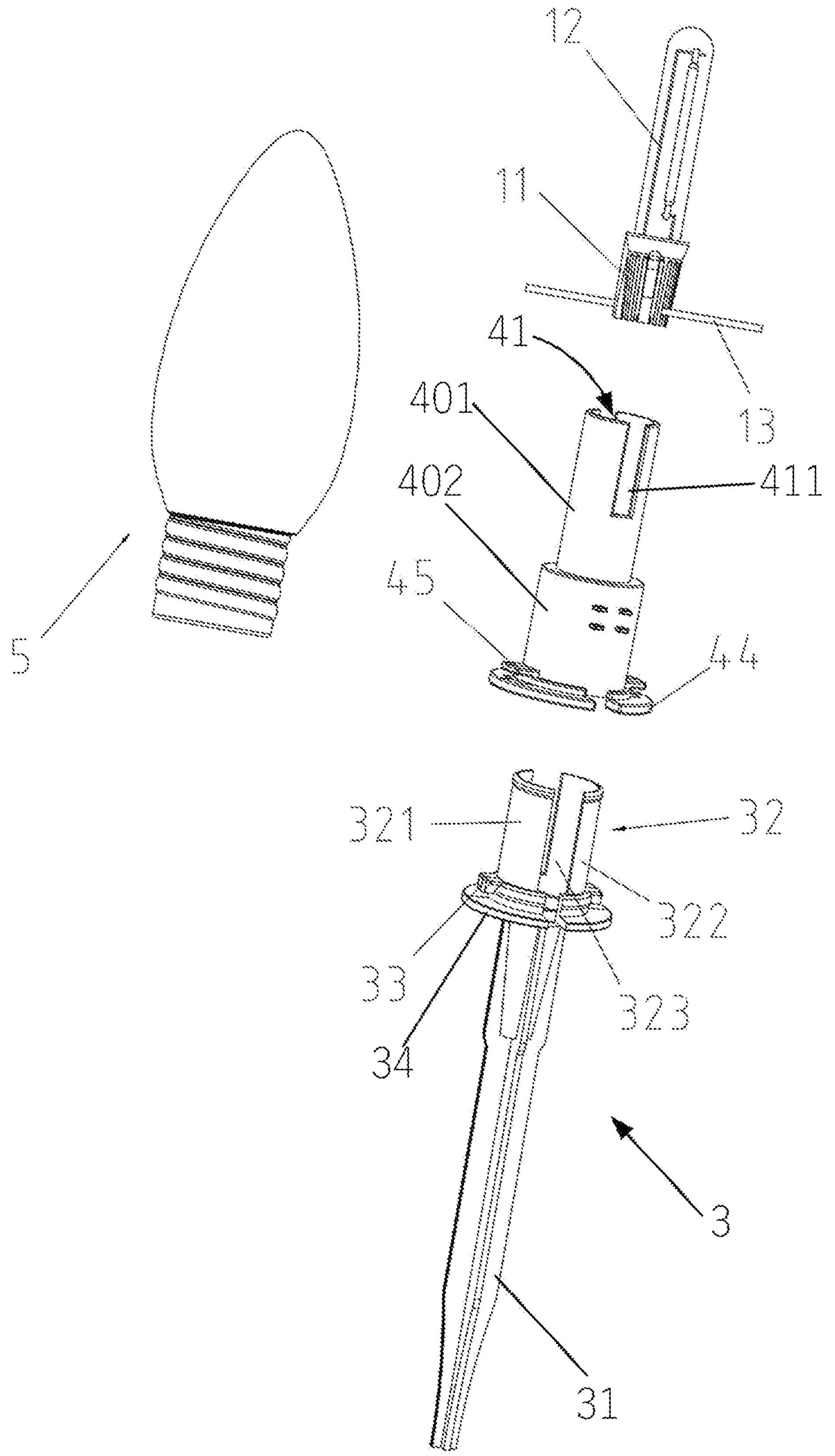
FIG. 4 is a schematic diagram of an overall exploded structure of the present disclosure.
Figure 5:
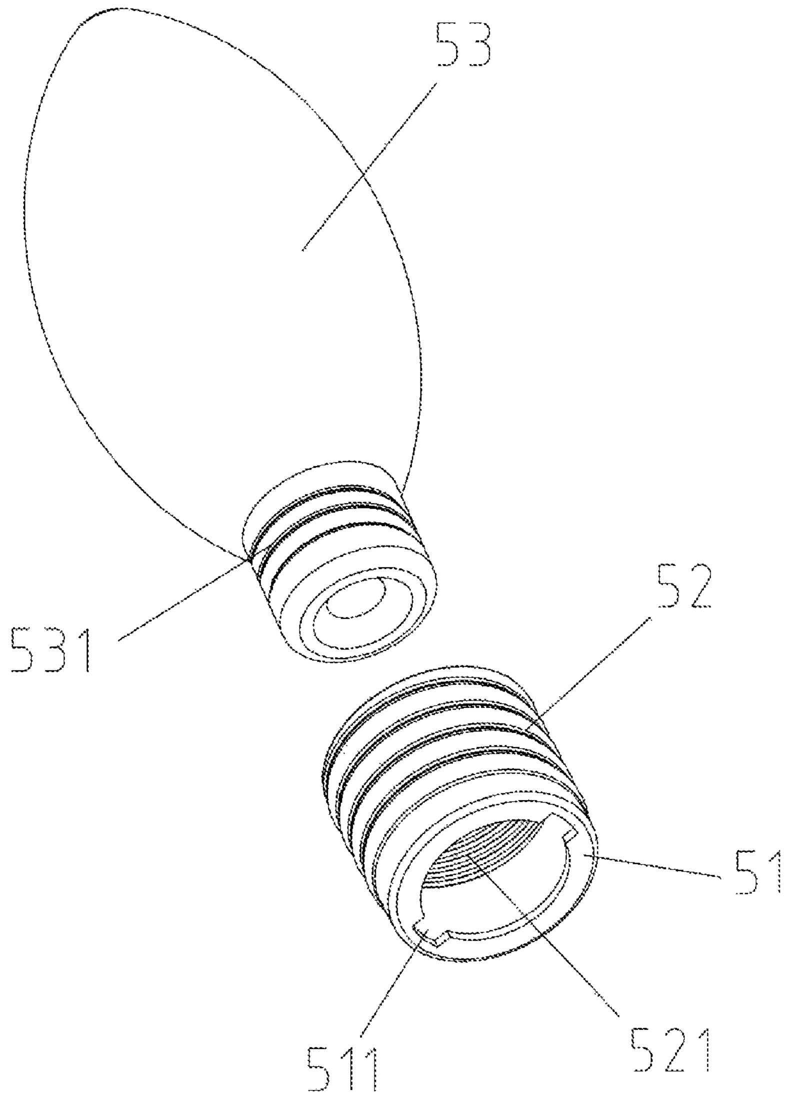
FIG. 5 is a schematic diagram of an exploded structure of an outer decorative lampshade of the present disclosure.
Figure 6:
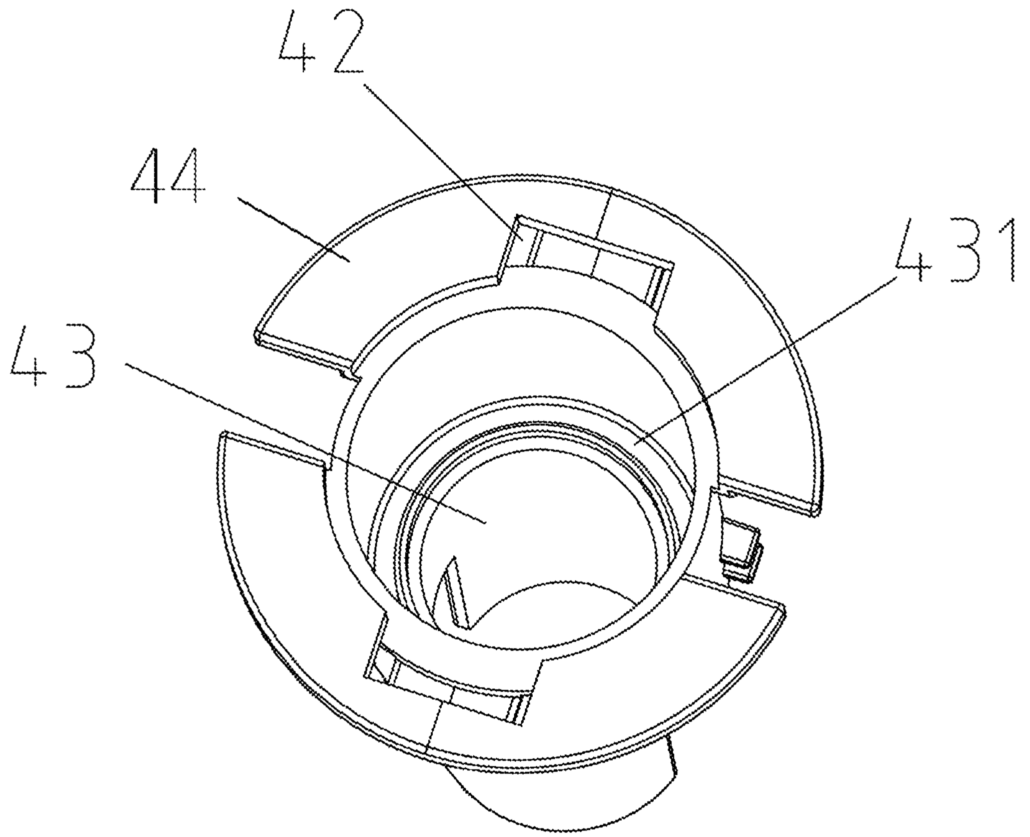
FIG. 6 is a schematic structural diagram of an inner mounting seat of the present disclosure.

Preferably, as shown in FIG. 4 and FIG. 6, the fastening portion 402 further defines an assembling groove 431 on an inner surface of its top, wherein the assembling groove 431 is in communication with the cavity 43 and configured for limiting and fixing the first elastic portion 321 and the second elastic portion 322. After the elastic portions are put into the cavity 43, top ends of the first elastic portion 321 and the second elastic portion 322 are clamped into the assembling groove 431 favorably, which can achieve reinforced connection.

In this technical solution, as shown in FIG. 4, the lamp 1 includes a lamp holder 11 and a bulb 12 electrically connected to the lamp holder 11. The lamp holder 11 is connected with a power cable 13. During assembling, the lamp holder 11 is placed in the accommodating position 41. A first cable accommodating channel 411 for allowing the power cable 13 to be threaded out is formed on a side wall of the accommodating position 41. Due to the first cable accommodating channel 411, the side wall of the accommodating position 41 is elastic. When the lamp holder 11 is assembled into the accommodating position 41, the side wall can outwards slightly pop out under a force to form a buffer space, and the lamp holder 11 is quickly put into the accommodating position 41, so that the assembling of the lamp holder 11 is facilitated, and damage to the lamp holder 11 can also be avoided.

Preferably, a group of second cable accommodating channels 6 for accommodating the power cable 13 is formed at joints of the insertion rod 3 and the inner mounting seat 4. After being threaded out of a first accommodating channel, the power cable 13 can also be threaded out of the second cable accommodating channels 6 on two sides of the lamp holder 11. The second cable accommodating channels 6 further store the power cable 13 on two sides of the lamp 1, so as to prevent messy distribution of the power cable 13. Meanwhile, when the inner mounting seat 4 and the outer decorative lampshade 5 are rotatably assembled, the power cable 13 will not be stuck between them to affect the assembling of the outer decorative lampshade 5, and it is also convenient to lead the power cable 13 out from the outer decorative lampshade 5.

As an embodiment, a clamping portion 412 for clamping the lamp 1 is arranged at a top end of the accommodating position 41. The clamping portion 412 is clamped with an opening end of the lamp holder 11, so that the lamp 1 can be fixed in the accommodating position 41 and is hard to move to affect a decorating effect.

Preferably, a first platform portion 44 is arranged at a bottom of the inner mounting seat 4. At least one group of bosses 45 are arranged above the first platform portion 44. A clearance is arranged between the bosses 45 and the first platform portion 44. A second platform portion 51 is arranged at a bottom end of the outer decorative lampshade 5. The second platform portion 51 is symmetrically provided with at least one group of gaps 511. When the bosses 45 are put into the outer decorative lampshade 5 from the gaps 511 and the inner mounting seat 4 is rotated along the outer decorative lampshade 5, the second platform portion 51 is stuck into the clearance between the first platform portion 44 and the bosses 45, so as to achieve fixed assembling of the lampshade and the grounding device 2. This assembling manner makes the lampshade mounted more conveniently and stably, and the lampshade is removable.

To further improve the technical solution, the outer decorative lampshade 5 is in a split type. The outer decorative lampshade 5 includes an outer decorative lamp cap 52 and an outer decorative bulb shell 53. Due to the outer decorative lampshade 5 that is in the split type, the outer decorative bulb shell 53 or the outer decorative lamp cap 52 can be replaced at any time, so that the flexibility is high, and the usage cost is reduced. On the other hand, the outer decorative bulb shell 53 and the outer decorative lamp cap 52 are respectively injection-molded and then assembled with each other to form the outer decorative lampshade 5. The process is simple and has low cost. An additional complex molding process including lamp cap plating, coating, and the like for an integrated lampshade is avoided.

As an embodiment, there are various connection manners between the outer decorative bulb shell 53 and the outer decorative lamp cap 52. When the outer decorative bulb shell 53 and the outer decorative lamp cap 52 are in threaded connection, an external thread portion 531 is arranged on an outer side of a bottom end of the outer decorative bulb shell 53, and the outer decorative lamp cap 52 is provided with an internal thread portion 521 matched with the external thread portion 531. The threaded connection is convenient removal, replacement, and assembling.

Preferably, a wire rod positioning portion 46 is arranged outside the inner mounting seat 4. Since the power cable 13 connected to a bottom of the lamp holder 11 easily spreads and upwarps towards two sides, a wire rod, a tie, or the like can be used to bundle the cable to the inner mounting seat 4. However, a bundling position should not be too high or too low, so that the inventor arranges the wire rod positioning portion 46 outside the inner mounting seat 4 to limit the bundling position. The wire rod positioning portion 46 is composed of several positioning blocks, and clearances for accommodating a wire rod are arranged in the middle of the positioning blocks.

The above contents are only preferred embodiments of the present disclosure. Those of ordinary skill in the art can make changes to the specific implementations and application scopes according to the idea of the present disclosure, and the contents of this specification shall not be understood as restrictions to the present disclosure.

What is claimed is:

1. A floor lamp device with an improved structure, comprising:

a lamp (1);

a grounding device (2), wherein the grounding device (2) comprises an insertion rod (3) and an inner mounting seat (4) which are in snap fit with each other; wherein the insertion rod (3) comprises a sharp end portion (31) arranged at a tail end of the insertion rod (3), a hollow assembling portion (32) arranged at a top end of the insertion rod (3), a supporting portion (34) arranged between the sharp end portion (31) and the assembling portion (32), and fasteners (33) arranged on the supporting portion (34) and located outside of a bottom of the assembling portion (32); wherein the sharp end portion (31) is convenient for grounding; the assembling portion (32) comprises a first elastic portion (321) and a second elastic portion (322); wherein the first elastic portion (321) and the second elastic portion (322) are arranged opposite each other on the supporting portion (34), and form an elastic clearance (323) between the first elastic portion (321) and the second elastic portion (322); the inner mounting seat (4) is hollow, and comprises an accommodating portion (401), a fastening portion (402), and a first platform portion (44);

wherein the accommodating portion (401) extends from an outer surface of a top of the fastening portion (402), and defines an accommodating position (41) for mounting the lamp (1); the fastening portion (402) extends from the first platform portion (44), and defines a cavity (43) for inserting the first elastic portion (321) and the second elastic portion (322); the first platform portion (44) defines, at its bottom surface, fastening positions (42) matched with the fasteners (33); and an outer decorative lampshade (5) sleeved on the inner mounting seat (4).

2. The floor lamp device with the improved structure according to claim 1, wherein the fastening portion (402) further defines an assembling groove (431) on an inner surface of its top, wherein the assembling groove (431) is in communication with the cavity (43) and configured for limiting and fixing the first elastic portion (321) and the second elastic portion (322).

3. The floor lamp device with the improved structure according to claim 1, wherein the lamp (1) comprises a lamp holder (11) and a bulb (12) electrically connected to the lamp holder (11); the lamp holder (11) is connected with a power cable (13); and a first cable accommodating channel (411) for allowing the power cable (13) to be threaded out is formed on a side wall of the accommodating position (41).

4. The floor lamp device with the improved structure according to claim 3, wherein a group of second cable accommodating channels (6) for accommodating the power cable (13) is formed at joints of the insertion rod (3) and the inner mounting seat (4).

5. The floor lamp device with the improved structure according to claim 1, wherein a clamping portion (412) for clamping the lamp (1) is arranged at a top end of the accommodating position (41).

6. The floor lamp device with the improved structure according to claim 1, wherein a first platform portion (44) is arranged at a bottom of the inner mounting seat (4); at least one group of bosses (45) are arranged above the first platform portion (44); a second platform portion (51) is arranged at a bottom end of the outer decorative lampshade (5); the second platform portion (51) is symmetrically provided with at least one group of gaps (511); and when the bosses (45) are put into the outer decorative lampshade (5) from the gaps (511) and the inner mounting seat (4) is rotated along the outer decorative lampshade (5), the second platform portion (51) is stuck between the first platform portion (44) and the bosses (45).

7. The floor lamp device with the improved structure according to claim 1, wherein the outer decorative lampshade (5) is in a split type; and the outer decorative lampshade (5) comprises an outer decorative lamp cap (52) and an outer decorative bulb shell (53).

8. The floor lamp device with the improved structure according to claim 7, wherein an external thread portion (531) is arranged on an outer side of a bottom end of the outer decorative bulb shell (53); and the outer decorative lamp cap (52) is provided with an internal thread portion (521) matched with the external thread portion (531).

9. The floor lamp device with the improved structure according to claim 1, wherein a wire rod positioning portion (46) is arranged outside the inner mounting seat (4).

* * * * *